United States Patent [19]

Gisdakis et al.

[11] Patent Number: 5,052,821

[45] Date of Patent: Oct. 1, 1991

[54] MEASURING INSTRUMENT FOR DETERMINING THE TEMPERATURE OF SEMICONDUCTOR BODIES AND METHOD FOR THE MANUFACTURE OF THE MEASURING INSTRUMENT

[75] Inventors: Spyridon Gisdakis, Munich; Helmut Tews, Unterhaching; Peter Zwicknagl, Stuttgart, all of Fed. Rep. of Germany

[73] Assignee: Siemens Aktiengesellschaft, Munich, Fed. Rep. of Germany

[21] Appl. No.: 445,688

[22] PCT Filed: Apr. 27, 1988

[86] PCT No.: PCT/DE88/00249

§ 371 Date: Dec. 1, 1989

§ 102(e) Date: Dec. 1, 1989

[87] PCT Pub. No.: WO88/08965

PCT Pub. Date: Nov. 17, 1988

[30] Foreign Application Priority Data

May 7, 1987 [DE] Fed. Rep. of Germany ....... 3715231

[51] Int. Cl.[5] .................. G01K 7/00; G01K 13/00
[52] U.S. Cl. .................... 374/179; 29/739; 324/158 R; 374/45; 437/180
[58] Field of Search .......... 374/178; 357/28; 29/838, 840; 324/158 R

[56] References Cited

U.S. PATENT DOCUMENTS

| | | | |
|---|---|---|---|
| 3,462,317 | 8/1969 | Baum et al. | 357/28 X |
| 4,047,436 | 9/1977 | Barnard et al. | 374/178 X |
| 4,571,608 | 2/1986 | Johnson | 357/28 |
| 4,590,507 | 5/1986 | Capasso et al. | 357/28 |
| 4,689,659 | 8/1987 | Watanabe | 357/28 X |
| 4,808,009 | 2/1989 | Sittler et al. | 374/176 |
| 4,820,659 | 4/1989 | Dholakia et al. | 29/739 X |
| 4,868,979 | 9/1989 | Fukushima et al. | 29/840 |
| 4,924,114 | 5/1990 | Ruhle | 374/185 X |

FOREIGN PATENT DOCUMENTS

| | | |
|---|---|---|
| 59-97024 | 6/1984 | Japan . |
| 59-155731 | 9/1984 | Japan . |
| 60-10137 | 1/1985 | Japan . |
| 60-230026 | 11/1985 | Japan . |

WO 81/02928 10/1981 World Int. Prop. O. .

OTHER PUBLICATIONS

"Time Resolved Temperature Measurement of Pulsed Laser Irradiated Germanium by Thin Film Thermocouple" by Baeri et al., Appl. Phys. Lett. 45 (4) Aug. 15, 1984, pp. 398–400.

"Dynamic Thermocouple Probe for Slip Chip Joining Furnace" by Carlson et al., IBM Technical Disclosure Bulletin, vol. 14, No. 11, Apr. 1972, p. 3227.

"Thick-Film Thermocouple" by Buharin et al., IBM Technical Bulletin, vol. 20, No. 5, Oct. 1977, p. 1889.

"Internal Temperature Monitoring Apparatus for Multilayer Ceramic Substrates", by Eggerding et al., IBM Technical Bulletin, vol. 21, No. 12, May 1979, p. 4839.

"Probe for Low Contact Force Temperature Measurement" by L. S. Goldman, IBM Technical Bulletin, vol. 26, No. 4, Sep. 1983, p. 1985.

*Primary Examiner*—Daniel M. Yasich
*Attorney, Agent, or Firm*—Hill, Van Santen, Steadman & Simpson

[57] ABSTRACT

The measuring instrument for determining the temperature in the interior of a semiconductor member (1) contains a thermoelement (5) integrated in the semiconductor member. In the manufacture of this measuring instrument, the thermoelement (5) is introduced into a recess (6) of the semiconductor member (1) and the recess (6) is filled out with a material that corresponds to the chemical composition of the environment of the recess (6). The measuring instrument for determining the surface temperature of a semiconductor member contains a thermoelement that is vapor-deposited on the surface of a semiconductor member or contains a thermoelement having a seating weight for placement against the surface of a semiconductor member. In the method for determining the temperature of semiconductor members during tempering processes, it is provided that the measuring instruments determine the temperature of reference semiconductor members. A measuring instrument together with a reference semiconductor member is thereby tempered together with the semiconductor member. The field of employment is the manufacture of semiconductor products.

5 Claims, 1 Drawing Sheet

MEASURING INSTRUMENT FOR DETERMINING THE TEMPERATURE OF SEMICONDUCTOR BODIES AND METHOD FOR THE MANUFACTURE OF THE MEASURING INSTRUMENT

BACKGROUND OF THE INVENTION

Tempering processes must be frequently carried out in the manufacture of semiconductor products, for example, semiconductor wafers for electronic components. It is thereby important to exactly monitor the temperature of a semiconductor member during the tempering process and to exactly regulate the temperature curve.

A thermoelement attached on a semiconductor member is disclosed in the publication by P. Baeri et al, "Time Resolved Temperature Measurement of Pulsed Laser Irradiated Germanium By Thin Film Thermocouple" in Applied Physics Letters 45, 398 through 400 (1984). In this arrangement, the heating of germanium laminae that are heated with pulsating laser light is measured. To this purpose, the germanium lamina having an outer bead is placed onto a coaxially arranged bimetal composed of constantan and iron having respective contacting surfaces that are conducted to the outside and held at room temperature.

Japanese application 60/23 00 26 published Nov. 15, 1985 discloses a temperature measuring instrument for an examination means for semiconductors. The purpose of this arrangement is comprised in identifying the condition close to the examination time in that the output of the temperature measuring member in a temperature measuring element having the same shape and the same material as the semiconductor element is connected to a probe of the examination means via a conductive probe and the identified temperature of the temperature measuring element of the thermometer that was connected to the probe is displayed.

The publication by K.A. Carlson, P. Disclafani and I. Osten in IBM Technical Disclosure Bulletin 14, 3227 (1972) discloses a thermoelement that is cemented into the substrate material and whose terminal wires are twisted to form a thicker wire.

The publication by C. L. Eggerding et al in IBM Technical Disclosure Bulletin 21, 4839 (1979) recites a temperature measuring means for a multi-layer ceramic, whereby the thermoelement is composed of two channels arranged in alignment in adjoining layers of the ceramic, these two channels being filled with different metals.

The publication by L. S. Goldmann in IBM Technical Disclosure Bulletin 26, 1985 (1983) recites a temperature measuring probe for measuring a surface temperature, this being composed of a thermoelement bead provided with thermoelement wires in a capsule of foil filled with thermally conductive material.

SUMMARY OF THE INVENTION

It is an object of the invention to specify methods and measuring instruments with which the temperature of a semiconductor member can be exactly and reproducibly determined during a tempering process and to recite methods for the manufacture of such measuring instruments.

The object is inventively achieved by a measuring instrument for determining the temperature of a semiconductor member having a thermoelement composed of a thermoelement sphere and thermoelement wires. The instrument has the thermoelement sphere surrounded on all sides with semiconductor material of which the semiconductor member is composed, and the thermoelement wires lead toward the outside through the semiconductor material. A method for manufacturing such a measuring instrument having a semiconductor member of III-V semiconductor material, comprises the steps of manufacturing a recess in this semiconductor member; introducing the thermoelement sphere into this recess; filling up the recess with a constituent of the III-V semiconductor material; and heating the semiconductor member in an atmosphere containing the other constituent of the III-V semiconductor material, so that this constituent is integrated into the material that fills up the recess. A method for manufacturing a measuring instrument having a semiconductor member composed of a single chemical element, comprises the additional features that a recess is manufactured in this semiconductor member; that the thermoelement sphere is introduced into this recess; and that the recess is filled up by selective deposition of the chemical element from the vapor phase. A method for manufacturing a measuring instrument comprises the further features that a recess is manufactured in this semiconductor member; that the thermoelement sphere is introduced into this recess; that the recess is filled up with powdery semiconductor material; and that this powdery semiconductor material is solidified by re-melting. A measuring instrument for determining the surface temperature of a semiconductor member with a thermoelement having a thermoelement sphere and having thermoelement wires has the thermoelement sphere resting on the surface of the semiconductor member; a seating weight that loads the thermoelement sphere being provided; and the thermoelement wires being conducted through this seating weight. A method for determining the temperature of a second semi-conductor member during a tempering process with the assistance of a first semiconductor member that simultaneously passes through the same tempering process and at which the temperature measurement is undertaken as a reference semiconductor member, has the steps of situating the first semiconductor member and the second semiconductor member in a tempering kiln in close proximity to one another during the temperature measurement; and fashioning the first semiconductor member as the measuring instrument as described above.

BRIEF DESCRIPTION OF THE DRAWINGS

The invention shall be set forth below with reference to exemplary embodiments in the FIGS.

DESCRIPTION OF THE PREFERRED EMBODIMENT

Figure 1:
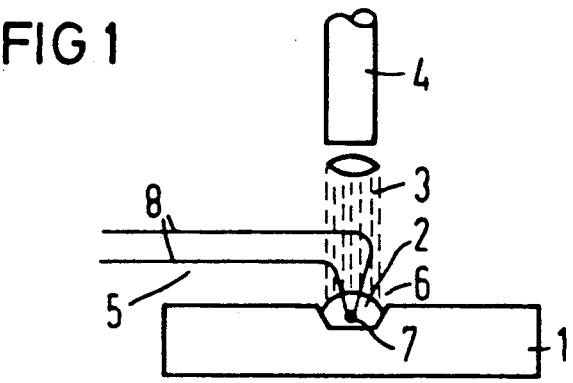
FIG. 1 is a schematic illustration of a manufacturing step in a method for manufacturing a measuring instrument of the present invention.

FIG. 1 schematically shows a manufacturing step in a method for manufacturing a measuring instrument for determining the temperature in the interior of a semiconductor member 1. A thermoelement 5 is integrated in this semiconductor member 1. The thermoelement sphere 7 of this thermoelement 5 is situated in a recess of the semiconductor member 1 and should be surrounded with semiconductor material on all sides. After the introduction of the thermoelement 5, the recess 6 of the semiconductor member 1 is filled with powdery semiconductor material 2 for this purpose, this semiconductor material 2 having the same chemical composition as the semiconductor member 1 in the environment of the recess 6. The powdery semiconductor material 2 is remelted with the assistance of a laser beam 3 of a laser 4, so that the thermoelement sphere 7 is surrounded on all sides. The re-melting can also be carried out with different methods, for example, in a furnace. Enough powdery semiconductor material is added so that the recess 6 is just filled up after the re-melting. The thermoelement wires 8 of the thermoelement 5 are conducted out at the side of the recess 6 of the semiconductor member 1.

Figure 2:
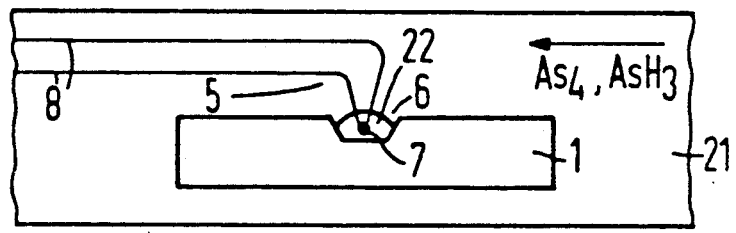
FIG. 2 is a schematic illustration of an alternative manufacturing step for manufacturing the measuring instrument of the present invention.

FIG. 2 schematically shows a manufacturing step in a further method for manufacturing a measuring instrument for determining the temperature in the interior of a semiconductor member 1. The recess 6 of the semiconductor member 1, for example, can be created by mechanical processing after the manufacture of the semiconductor member 1. The thermoelement sphere 7 of the thermoelement 5 is introduced into the recess 6. The thermoelement wires 8 are conducted out at the side of the recess 6 of the semiconductor member 1. In this example, the semiconductor member 1 is composed of gallium arsenide, a III–V semiconductor. After the introduction of the thermoelement 5 into the recess 6, this recess is filled with liquid gallium 22 and the instrument is introduced into a reaction tube 21. An atmosphere containing arsenic, for example, having $As_4$ or $AsH_3$, is produced in the reaction tube 21. A temperature of about 750° C. is set in the reaction tube 21. The gallium that was introduced into the recess thereby reacts with arsenic to form polycrystalline gallium arsenide that grows into the semiconductor member 1 and thereby surrounds the thermoelement sphere 7 on all sides.

A further method for filling the recess 6 can be applied when the semiconductor member 1 is composed of a single chemical element, for example, silicon or germanium, in the environment of the recess 6. After introduction of the thermoelement 5, the recess 6 of the semiconductor member 1 can then be filled by deposition of the semiconductor element from the vapor phase.

Figure 3:
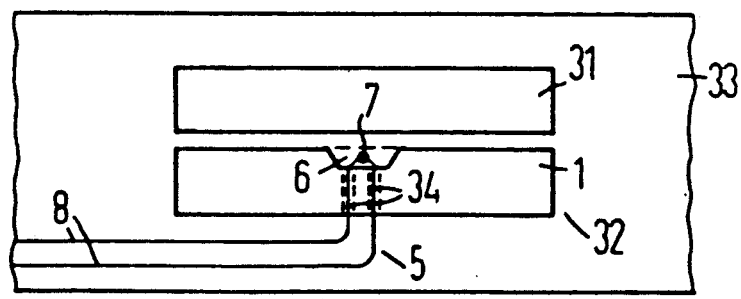
FIG. 3 is a schematic illustration of a further alternative manufacturing step for manufacturing the measuring instrument of the present invention.

As shown in FIG. 3, the measuring instrument can also be manufactured such that the thermoelement wires 8 are conducted out at a side of the semiconductor member different from the side into which the thermoelement sphere 7 is introduced.

FIG. 3 schematically shows the arrangement comprising a second semiconductor member 31 and a measuring instrument 32 in a tempering kiln 33. The measuring instrument 32 contains a first semiconductor member 1 that is fashioned as reference to the second semiconductor member 31 so that the temperature curve measured in the first semiconductor member 1 during the tempering process coincides with the temperature curve in the second semiconductor member 31. The measuring instrument 32 is arranged in close proximity to the second semiconductor member 31 so that temperature fluctuations of the environment of the second semiconductor member 31 and of the measuring instrument 32 do not lead to measuring errors. The thermoelement wires 8 of the thermoelement 5 in this exemplary embodiment are conducted toward the outside through bores 34 in the first semiconductor member 1 at that side facing away from the second semiconductor member 31. What this achieves is that the semiconductor members can be arranged in closer proximity. When the measuring instrument 32 together with the second semiconductor member 31 experience the same tempering process, the temperature that prevails in the interior of the second semiconductor member 31 can be determined with this method. The temperature measurement in the interior of the first semiconductor member 1 is especially advantageous when the semiconductor member is subjected to rapid temperature changes and the curve of the surface temperature therefore differs form the curve of the temperature in the interior of the semiconductor member. The measuring instrument 32 can be specifically constructed such that the thermoelement sphere 7 is situated in a specifically defined layer of the first semiconductor member 1, so that how the temperature curve proceeds in the comparable layer of the second semiconductor member 31 can thus be determined. The temperature determined with the measuring instrument 32 can be utilized for temperature regulation of the tempering process. The temperature regulation can thus be exactly adapted to the temperature conditions in the second semiconductor member 31.

Some thermoelement materials can chemically react with constituents of semiconductors, for example, aluminum of a chromium-alumel thermoelement can chemically react with arsenic of a semiconductor that contains arsenic. In the measuring instruments, it is therefore provided to employ a thermoelement that is provided with a thin protective coat if there is a risk that constituents of the thermoelement will chemically react with constituents of the semiconductor member. The protective coat, for example, can be composed of $SiO_2$ or $Si_3N_3$.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. A measuring instrument for determining the temperature of a semiconductor member having a thermoelement composed of a thermoelement sphere and thermoelement wires, comprising: the thermoelement sphere surrounded on all sides in a recess of the semiconductor member with a same semiconductor material of which the semiconductor member is composed; the same semiconductor material in the recess of the semiconductor member fused to the semiconductor material of the semiconductor member; and the thermoelement wires leading toward the outside through the semiconductor material.

2. A method for determining the temperature in the interior of a semiconductor member by forming the thermoelement, in a semiconductor member, composed of a thermoelement sphere and thermoelement wires, the thermoelement sphere surrounded on all sides in a recess of the semiconductor member with a same semiconductor material of which the semiconductor member is composed, and the thermoelement wires leading toward the outside through the semiconductor material, comprising the steps of: providing a semiconductor member of Group III-V semiconductor material; manufacturing said recess in said semiconductor member; introducing the thermoelement sphere into said recess; filling up the recess with one constituent of the Group III-V semiconductor material; and heating the semiconductor member in an atmosphere containing another constituent of the Group III-V semiconductor material, so that said another constituent is integrated into the one constituent that fills up the recess.

3. A method for determining the temperature in the interior of a semiconductor member by forming the thermoelement, in a semiconductor member, composed of a thermoelement sphere and thermoelement wires, the thermoelement sphere surrounded on all sides in a recess of the semiconductor member with a same semiconductor material of which the semiconductor member is composed, and the thermoelement wires leading toward the outside through the semiconductor material, comprising the steps of: providing a semiconductor member composed of a single chemical element manufacturing said recess in said semiconductor member; introducing the thermoelement sphere into said recess; and filling up the recess by selective deposition of the chemical element from a vapor phase.

4. A method for determining the temperature in the interior of a semiconductor member by forming the thermoelement, in a semiconductor member, composed of a thermoelement sphere and thermoelement wires, the thermoelement sphere surrounded on all sides in a recess of the semiconductor member with a same semiconductor material of which the semiconductor member is composed, and the thermoelement wires leading toward the outside through the semiconductor material, comprising the steps of: providing a powdery semiconductor material of a same chemical composition as the semiconductor material of which the semiconductor member is composed; manufacturing said recess in said semiconductor member; introducing the thermoelement sphere into said recess; filling up the recess with said powdery semiconductor material; and solidifying said powdery semiconductor material.

5. The method according to claim 4, wherein the step of solidifying said powdery semiconductor material is carried out by melting at least said powdery semiconductor material with a laser beam.

* * * * *